Dec. 26, 1967   J. W. KALB   3,360,686
LIGHTNING PROTECTION ASSEMBLY FOR OVERHEAD LINES
Filed Aug. 5, 1966   2 Sheets-Sheet 1
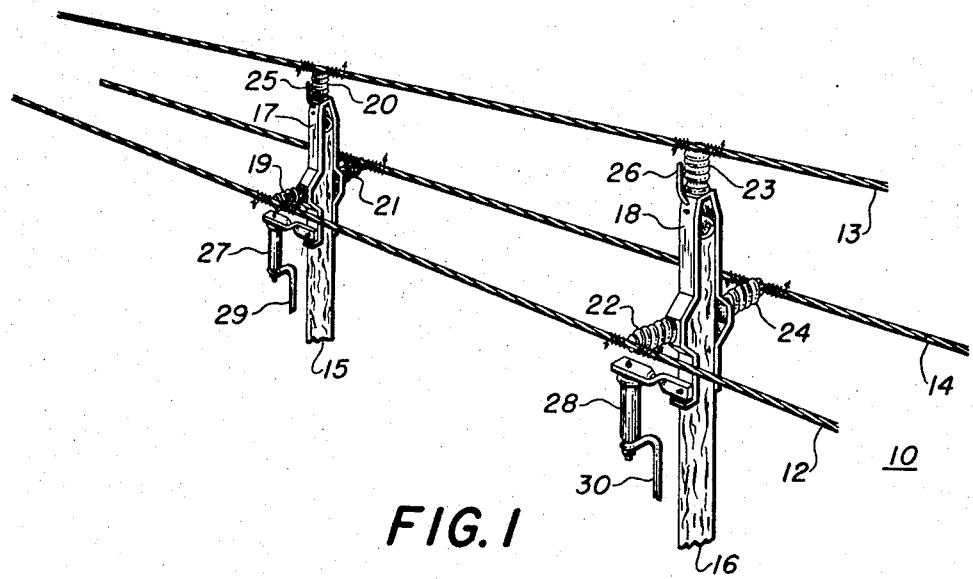
FIG. 1
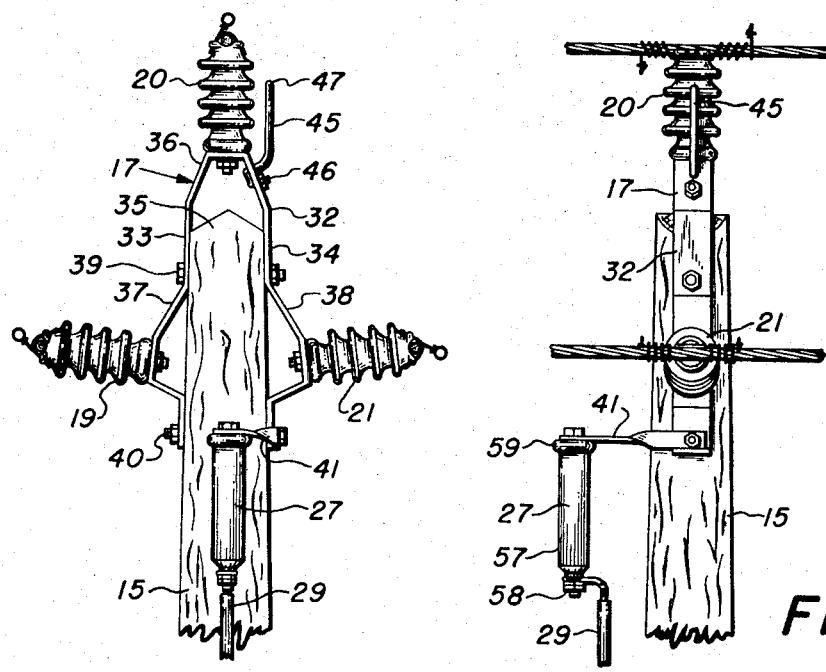
FIG. 2   FIG. 3
INVENTOR.
JOHN W. KALB
BY
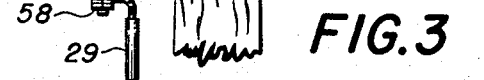
ATTORNEY

# United States Patent Office 3,360,686
Patented Dec. 26, 1967

3,360,686
LIGHTNING PROTECTION ASSEMBLY FOR OVERHEAD LINES
John W. Kalb, Medina, Ohio, assignor to The Ohio Brass Company, Mansfield, Ohio, a corporation of New Jersey
Filed Aug. 5, 1966, Ser. No. 573,771
12 Claims. (Cl. 317—72)

This application is a continuation-in-part of application Ser. No. 455,860, filed May 14, 1965, and now abandoned.

This application relates to electric power systems and, more specifically, to an overhead distribution line for transmitting electric energy from a power station to one or more consumers or load points.

A principal object of the invention is to simplify and improve electric distribution lines and power systems.

Another object of the invention is to reduce the cost of circuits and devices for protection against lightning-induced overvoltages in electric distribution lines.

Another object of the invention is to reduce system interruption in installations where contaminated atmospheres significantly affect electric power systems.

Still another object of the invention is to facilitate the utilization of unitary insulator and support assemblies in overhead power lines.

In power distribution systems, it has been proposed to utilize a unitary assembly for supporting the wires of an electric distribution line from the pole which carries the wires in overhead relation to the earth. Unitary assemblies are desirable for line support inasmuch as a complete insulation and support assembly may be manufactured as a single unit, installation and construction time is reduced, uniform design characteristics are provided, and the appearance of the line structure is enhanced.

In the utilization of unitary assemblies for line support, particularly those in which the several line insulators are carried by a common metal bracket, with one of the line conductors, referred to as the top line conductor, disposed above and in overhead shielding relation with respect to the remaining line conductors, referred to as the lower line conductors, certain problems arise in the design and operation of the power line. Specifically, a relatively sophisticated lightning arrester incorporating multiple series gaps, relatively low discharge IR voltages, and valve blocks with high exponents must be connected to the top line conductor in order to prevent flashover of the insulator due to lightning effects on the top conductor, and the entire conductor system must be protected against faults to ground. Again, in locations where atmospheric contaminants are present in relatively high concentration, contaminant-induced flashovers of the support insulators produce faults and result in system interruption because of circuit breaker operation. The design alternatives are economically unacceptable or undesirable, requiring, in the first instance, exchange of durability for cost and, in the second instance, substantial overdesign of the insulating structure on which the line conductors are carried.

I have found that a simplified solution to the above problems can be achieved by utilizing the protective system described in my prior application, Serial No. 411,342, filed Nov. 16, 1964, now Patent No. 3,328,640, in conjunction with the unitary support assembly. Specifically, as described herein, I provide a line protection arrangement in which a series discharge circuit, including a valve discharge resistor, is connected from the bracket of the unitary assembly to ground, and an arc gap electrode is supported by the bracket adjacent the top insulator and cooperates with the top conductor to form an arc gap across the top insulator.

A distribution line constructed with unitary support assemblies embodying the above-described arrangement at each of the line poles is protected against lightning-induced overvoltages by breakdown of the arc gap across the top insulator to form a discharge path from the top conductor through the bracket and the discharge circuit to ground. Inasmuch as the bracket voltage with respect to ground is determined by the IR voltage across the discharge resistor during discharge of the overvoltage, the voltage across the insulators supporting the lower conductors is less than the discharge IR voltage being, reduced by the voltage coupled from the top conductor to the lower conductors. Moreover, the generation of a lightning-induced overvoltage at any pole results in flashover of the arc gap at one or more adjacent poles so that there is an inherent load sharing in the successive discharge circuits and accommodation of discharge of great intensity, failure of resistors, insulators, and the like.

Further, the arrangement protects the system against contaminant-induced flashovers since an increase in bracket voltage, resulting from leakage current flow through the discharge circuit, extinguishes the arc and prevents phase-to-phase faults and consequent system interruption.

The invention is disclosed in the following detailed specification and claims, taken in connection with the appended drawings in which:

FIG. 1 is a perspective view of an overhead distribution line constructed as described herein;

FIG. 2 is an elevation view of a unitary pole-top assembly utilized in the distribution line of FIG. 1;

FIG. 3 is a side elevation view of the apparatus of FIG. 2;

Figure 4:
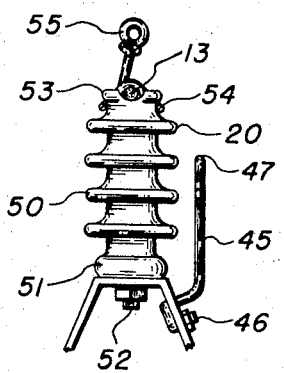
FIG. 4 is an enlarged view of the top insulator and associated arcing electrode of the apparatus of FIG. 2.

Referring now to FIG. 1, the distribution line 10 includes a plurality of line conductors 12, 13, and 14 arranged in a generally triangular configuration and supported above the earth by wood poles 15 and 16. The conductors are carried from the poles by unitary assemblies 17 and 18 including insulators 19, 20, and 21 and insulators 22, 23, and 24, respectively, as hereinafter described. Associated with the poles are discharge gaps 25 and 26, discharge resistors 27 and 28, and ground leads 29 and 30.

The conductors 12, 13, and 14 are arranged in a triangular configuration with the conductor 13 at the apex of the triangle and the conductors 12 and 14 at the lateral extremities of the triangle. In this arrangement, the top conductor 13 functions as a shield with respect to the lower conductors 12 and 14 and forms a protective region for lightning discharges to or in the vicinity of the line. The conductors 12, 13, and 14 are the principal power carrying wires of the distribution line, also referred to as phase conductors in the usage of the art.

The unitary pole-top assembly 17 is illustrated in more detail in FIG. 2 and FIG. 3. As there shown, the assembly 17 is constituted as an elongate metal bracket 32 arranged in an inverted generally U-shaped configuration with the arms 33 and 34 extending over and along the pole 15 from the top extremity 35 downward along the body of the pole. The bracket 32 is formed with a yoke 36 which is spaced from the extremity 35 of the pole and supports the insulator 20 above the pole. The two arms 33 and 34 have two laterally spaced parts 37 and 38 which support the insulators 19 and 21 laterally outward from the body of the pole 15. The bracket 32 is secured to the pole by a bolt fastener 39 which extends transversely through the arms 33 and 34 and through the pole between the yoke 36 and the portions 37 and 38, and by a bolt fastener 40 which extends transversely through the arms 33 and 34 and through the pole below the parts 37 and 38 of the bracket.

The bracket 32 constitutes a low impedance conducting path along the pole 15 and determines current flow along the pole between the insulator 20 and the insulators 19 and 21 to the extent that such current flow takes place under abnormal, transient, or other conditions.

A bracket 41 supports the discharge resistor 27 from the bolt fastener 40 and electrically and mechanically connects one terminal of the resistor 27 to the bracket 32. The remaining terminal of the resistor 27 is secured to the ground lead 29.

A gap electrode 45, constituted by a wire part, is attached to the bracket 32 by means of a screw fastener 46. The electrode 45 has a tip 47 which is spaced from the conductor 13 to determine an arcing path having a breakdown voltage less than the breakdown voltage of the insulator 20 and of the insulators 19 and 21 from the respective conductors to the bases of the insulators or to the bracket 32. The electrode 45 may be manufactured from wire of corrosion-resistant material, as stainless steel wire, or cadmium plated steel wire.

FIG. 4 illustrates the insulator 20 and gap electrode 45 of the pole-top assembly 17 in more detail. As therein shown, the insulator 20 comprises an insulating body 50 and a metal base 51 supporting the insulating body 50 from the bracket 32 by means of a bolt fastener 52. The insulating body 50 is formed with a head 53 having a diametral top groove for receiving the conductor 13 and a circumferential groove for receiving a circumferentially extending portion 54 of the tie wire 55. The electrode tip 47 is spaced from the circumferential portion 54 of the tie wire 55 which cooperates with electrode 45 to determine an arcing path shorter than the arcing paths of the insulators 19 and 21 at breakdown voltages. The electrode 45 may be positioned to form an arc to the conductor 13.

The insulators 19, 20, and 21 are of known construction, being of the type referred to in electric power practice as post insulators. Post insulators are characterized, in part, by the metal base 51 which includes a part extending circumferentially about the end of a solid or tubular insulator body 50, and serves as an electrical terminal as well as a mechanical support for the insulator body. Post insulators are particularly useful in the practice of the invention since the base constitutes a well defined terminus for an arc produced by flashover across the insulator, and for leakage currents over the surface of the insulator, and because contaminants are deposited relatively uniformly on the insulator body. Nonetheless, pin-type and other insulators and insulating bodies are useful in practicing the invention. Each insulator is characterized by its leakage distance and breakdown voltage, and these factors are referred to the base of the insulator, or equivalent metal part, and to the conductor tie wire or cap, according to the construction embodied at the end thereof.

The discharge resistor 27 comprises a resistor of silicon carbide enclosed in a housing constituted by a tubular part 57 of insulating material. The tubular part 57 is closed at one end and has an end terminal 58 for connecting the resistive element to the ground lead 29. A metal cap 59 closes the remaining end of the tubular part 57 and comprises an electrical terminal and mechanical support connecting the resistor to the bracket 32.

The discharge resistor 27 is constructed as a body of silicon carbide in a ceramic or other rigid binder and has a decreasing resistance function of increasing current magnitude, as is known in the lightning arrester art and referred to as a valve resistor. Valve resistors having a voltage exponent in the range from about 3 to 7 or more for surge discharge currents and exponents of 1.5 or less for currents produced by system voltages are useful in the circuit arrangements herein described. The corresponding resistances of exemplary valve resistors are about 0.5 ohm per kv. of system voltage (line-to-ground RMS AC voltage) and about 300 ohms per kv. of system voltage. Discharge resistors having voltage exponents as low as 1 are useful for leakage current protection, and the use of discharge resistors having other linear or non-linear resistance characteristics is described in U.S. application Ser. No. 411,342, filed Nov. 16, 1964, now Patent 3,328,640.

The construction and functioning of the insulators and discharge resistor of the pole-top assembly 18 and the assemblies of the remaining poles of the line is the same as that of the pole-top assembly 17.

A lightning stroke to the conductor 13 at the pole 15 fires the gap between the tie wire 55 or the conductor 13 and the electrode 45 so that a conductive path is provided from the conductor 13 through the gap and the discharge resistor 27 and ground lead 29 to the earth. The discharge currents develop a voltage across the resistor 27 which determines the voltage, referred to as the discharge IR voltage, between the top conductor 13 and the bracket 32 and ground as a function of the magnitude of the discharge energy and current. According to the invention, the voltage coupled to the lower conductor during discharge of the gap across the top insulator reduces the voltage across the lower insulators to a value less than the discharge IR voltage.

It will be understood that the voltage induced on the top conductor 13 by the lightning field is coupled to the side conductors 12 and 14 by the mutual capacitance between the line conductors. The magnitude or effect of this coupling is determined by the mutual capacitance between the conductors relative to the capacitance from the conductors to ground, and may be expressed as a voltage ratio, for example, 30%. Accordingly, overvoltages are developed on the side conductor which are in the order of 30% of the overvoltage developed on the top conductor, even though the top conductor 13 functions as an overhead shield means with respect to the lower conductors as regards the field induced by the lightning activity in the region of the line.

During discharge, the voltage between the lower conductors and ground is determined by the coupling between the top conductor and lower conductors, as just described for induced overvoltages, and the voltage between the bracket and ground is determined by the resistance characteristic of the discharge resistor. The maximum voltage which appears across the lower insulators is the discharge IR voltage, reduced in magnitude by the coupling factor, or 70% of the discharge IR voltage in the example above. Accordingly, the size of the insulator and discharge resistor may be determined as a matter of design, one result being that a discharge resistor having a high resistance may be used with a given insulator and line voltage so that power follow currents are reduced and resistor durability increased. Additionally, it will be seen that increase of the coupling between the conductors reduces the voltage across the lower insulators in the apparatus of the invention, whereas that voltage is increased in the apparatus of the prior art.

It will be recognized that certain modifications of the apparatus of FIG. 1 to FIG. 4 are useful to carry out the invention. Thus, the metal electrode 45 functions to determine an arcing path in shunt with the top insulator 20 from the top conductor 13 to the bracket 17 having a breakdown voltage less than the breakdown voltage determined by the leakage distance of the insulator 20. This arrangement is particularly useful in practical constructions of the assembly 17, wherein the insulators 19, 20, and 21 are all of the same size and have the same leakage distance, and where practical limitations upon the size and exponent of the valve discharge resistor, or the coupling factors involved in the particular line, dictate a substantially lesser breakdown voltage from the top conductor to the bracket 32 than from the lower conductors 12 and 14 to the bracket 32. Other embodiments of the invention may omit the electrode 45 entirely where the insulators 19 and 21 are larger than the insulator 20, that is, having a longer leakage distance and greater breakdown voltage than the insulator 20. Certain designs may omit the electrode 45 although the insulators 19 and 21 are of the same size as the insulator 20.

The magnitude or extent of the atmospheric activity adjacent the line may be such that substantially equal lightning-induced overvoltages may exist at more than one pole position or at a considerable number of pole positions along the line. Thus, a lightning stroke to the top conductor 13 at positions substantially midway between the poles 15 and 16 will result in overvoltages which discharge simultaneously through the gaps of the electrodes 25 and 26 and through the discharge resistors 27 and 28. Electrical storms of limited intensity may be localized or of such low energy that only one discharge circuit functions to reduce the overvoltage on the top conductor, but even localized activity at one pole will ordinarily require load sharing discharges at adjacent poles in each direction from the principal discharge location. Each pole-top assembly cooperates with the pole-top assemblies of adjacent poles to provide load sharing when lightning-induced overvoltages on the top conductor produce a discharge IR voltage of the first assembly sufficient to discharge the gaps of adjacent poles.

It will be understood that the load sharing discharges just described reduce the duty factor on the valve resistor 27, or other individual valve resistors, and that economic or functional limitations upon the size or strength of the discharge resistor may be accommodated by spacing of the poles, adjustment of the discharge gap, and the like. It is a feature of the invention that a small discharge current is sufficient to produce load sharing between adjacent poles.

The arrangement of FIGS. 1 to 4, wherein a separate gap electrode forms a separate arcing path in shunt with the top insulator, is preferred for the reasons set forth above. Additionally, the lateral disposition of the separate arcing path perpendicular to the direction of the conductor wire permits arc movement and elongation, and tends to extinguish the arc.

The apparatus of the invention functions to reduce the effect of contaminants on the exterior surfaces of the insulators 19, 20, and 21, inasmuch as leakage currents over the surface of the insulator are conducted to ground through the discharge circuit and generate a discharge IR voltage across the valve resistor 27. The discharge IR voltage increases the voltage of the bracket 32 with respect to ground and reduces the voltage across the insulator so that the flashover does not occur. The circuit continues in operation until the contaminant is cleared away by heating or other effects. Accordingly, the reliability of the distribution line is improved and smaller insulators can be utilized for a given distribution voltage than in conventional distribution lines.

In one construction of a power line as described above, the arcing distance of all three insulators in the device of FIGS. 2 and 3 was about 7", and the arcing distance between the extremity 47 of electrode 45 and the tie wire 54 was about 4". The resistance of the discharge valve resistor for system voltages was 3,000 ohms and the resistance while discharging a 10 kiloampere surge current was about 5 ohms. With this arrangement, the assembly 10 supported a power line in which the three conductors 12, 13, and 14 carried a system voltage of 13.2 kilovolts RMS AC line-to-line without a fault being established when subjected to a discharge having an estimated magnitude of 100 kiloamperes, a wave shape of 5×12 microseconds, and producing a surge voltage of 120 kv. upon the conductor 13.

Figure 5:
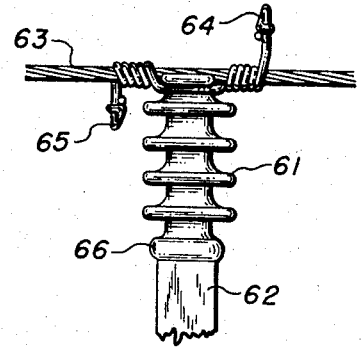
FIG. 5 is a side elevation view of the apparatus of FIG. 4, showing an alternate embodiment of the arc gap.

In the embodiment of FIG. 5 an insulator 61, comprising a top insulator of a pole-top assembly having a support bracket 62, carries a top conductor 63 secured to the head of the insulator by means of a tie wire 64. The tie wire 64 has a depending part 65 which is spaced from the base 66 of the insulator 61 a distance less than the arcing length of the insulator 61 to constitute an arc gap corresponding to the arc gap between the electrode 45 and the tie wire 54 or the conductor 13. The tie wire 64 may be formed of stainless steel wire although composite wires such as plated steel are preferred for ease of handling while providing a reasonable life.

Other arrangements of the embodiment of FIG. 5 may be utilized in which the gap electrodes are constituted by metal base and cap parts of the insulator.

Figure 6:
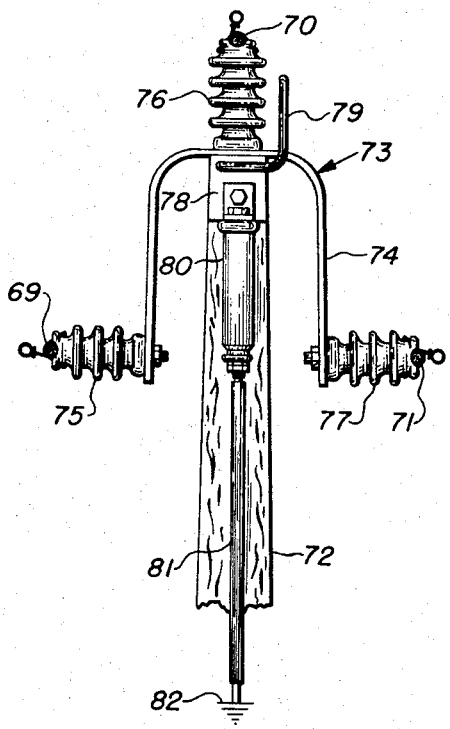
FIG. 6 is an elevation view of another unitary pole-top assembly.
Figure 7:
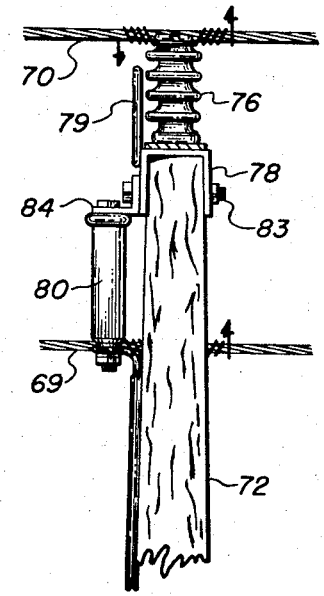
FIG. 7 is a side elevation view of the apparatus of FIG. 6.

In the embodiment of FIG. 6 and FIG. 7, the line wires 69, 70, and 71 are carried from a line pole 72 by a pole-top assembly 73, comprising an insulator bracket 74, insulators 75, 76, and 77, a support bracket 78, and gap electrode 79. A discharge resistor 80 and ground wire 81 constitute a discharge circut to an earth ground 82.

The assembly 73 is carried from the pole 72 by the support bracket 78 which is formed as a U-shaped part and extends over the top of the pole and along the opposite sides thereof. A bolt 83 secures the bracket 78 to the pole 72 and also connects the discharge resistor 80 to the bracket 78 by means of an angle bracket 84. The insulator bracket 74 is secured to the cross part of the bracket 78 by means of a screw fastener (not shown) which extends from the base of the insulator 76 through the bracket 74 and the cross part of the support bracket 78. The arcing electrode 79 comprises a length of stainless steel wire welded or otherwise fastened to the support bracket 78. The tip of the electrode 79 is spaced from the conductor 70 according to the considerations set forth above.

In one embodiment of the apparatus of FIG. 6 and FIG. 7, the insulator bracket 74 is formed as a metal part or channel piece having an inverted generally U-shaped configuration for mechanical support of the side insulators 75 and 77 and side conductors 69 and 71.

According to another embodiment of the apparatus of FIG. 6 and FIG. 7, the bracket 74 is formed as a piece of structural insulating material, such as a channel piece of glass fiber reinforced polyester resin or like material, having the requisite mechanical and electrical properties for supporting the side conductor wires 69 and 71. The insulators 75, 76, and 77 may preferably comprise ceramic insulating bodies, such as the insulator 20 of FIG. 2, or may be formed of the same structural insulating material as the bracket 74.

When the bracket 74 is formed of insulating material or the assembly just referred to is used with an insulating cross arm, the breakdown voltage of the shunt discharge path from the top conductor to the arcing electrode or insulator base may be greater than the breakdown voltage of the side insulators 75 and 77. However, in circumstances where contaminants on the surfaces of the bracket 74, or the partial electrical breakdown of the bracket material by tracking or the like may impart a conductivity to the surface of the bracket, the breakdown voltage of the discharge path across the top insulator is less than the breakdown voltage of the side insulators so that the discharge circuit limits the voltage impressed upon the side insulators 75 and 77, reduces further breakdown or deterioration of the material of the bracket, and protects the system components connected to the side conductors.

In another embodiment of the apparatus of FIG. 6 and FIG. 7, an assembly, comprising the insulator 76, support bracket 78, arc gap means such as the gap electrode 79, and the discharge resistor 80 may be utilized, apart from the bracket 74 and insulators 75 and 77, as a single phase discharge device. This apparatus may be used alone or in conjunction with a pole-top assembly constituted with a wood or composition cross arm supporting insulators and conductors corresponding to the insulators 75 and 77 and conductors 69 and 71.

It is to be understood that the foregoing description is not intended to restrict the scope of the invention and that various rearrangements of the parts and modifications of the design may be resorted to. The following claims are directed to combinations of elements which embody the invention of this application.

I claim:

1. An electric power line comprising a plurality of line poles constructed of insulating material, a plurality of line phase conductors including a top conductor and a lower conductor disposed below the top conductor, the top conductor comprising an overhead shield means with respect to the lower conductor and substantially preventing lightning strokes upon the phase conductors simultaneously, means secured to each pole at the top thereof in spaced and insulated relation to ground comprising bracket means secured to the pole and a top and a lower insulator carried by the bracket means at the top and lower part thereof, the said insulators supporting the top conductor and lower conductor, respectively, each insulator including an insulating body and metal base means and the base means determining the breakdown voltage and receiving the breakdown discharge at the bracket end of the insulator, conductive means connecting the base means of the insulators, and a discharge circuit from the insulators to ground, comprising a valve discharge resistor connected to the said conductive means and to ground, the said discharge resistor having resistance magnitude and exponent related to the coupling between the top conductor and lower conductors and to the breakdown voltages of the insulators and functioning to determine a voltage across each insulator less than the flashover voltage of the lower insulators when discharging lightning-induced voltages across the top insulator, and less than the flashover voltage of any of the insulators when discharging contaminant-induced leakage currents.

2. An electric power line comprising a plurality of line poles constructed of insulating material, a plurality of line phase conductors including a top conductor and a plurality of lower conductors disposed below the top conductor, the top conductor comprising an overhead shield means with respect to the lower conductors and substantially preventing lightning strokes upon the three conductors simultaneously, means secured to each pole at the top thereof in spaced and insulated relation to ground comprising bracket means secured to the pole and a top and two lower insulators carried by the bracket means at the top and lower parts thereof, the said insulators supporting the top conductor and two lower conductors, respectively, each insulator including an insulating body and metal base means, the base means determining the breakdown voltage and receiving the breakdown discharge at the bracket end of the insulator and the breakdown voltage of the top insulator being less than the breakdown voltage of the lower insulators, conductive means connecting the base means of the insulators, and a discharge circuit from the insulators to ground, comprising a valve discharge resistor connected to the said conductive means and to ground, the said discharge resistor having resistance magnitude and exponent related to the coupling between the top conductor and lower conductors and to the breakdown voltages of the insulators and functioning to determine a voltage across each top insulator less than the flashover voltage of the lower insulators when discharging lightning-induced voltages across the top insulator, and less than the flashover voltage of any of the insulators when discharging contaminant-induced leakage currents.

3. An electric power line in accordance with claim 2, in which the insulators have equal leakage distances and in which the lessened breakdown voltage across the top insulator is constituted by arc gap means in shunt with the top insulator.

4. An electric power line in accordance with claim 3, in which the conductive means comprises a metal bracket part extending over and along a pole, the arc gap means comprises a metal electrode part secured to the metal part, and the metal part comprises the conductive means electrically connecting the bases of the insulators and the discharge resistor.

5. An electric power line in accordance with claim 4, in which the bracket part, insulators, and gap electrode comprises a unitary assembly, and means securing the assembly to the pole, means securing the line conductors to the insulators at the extremities thereof, and means electrically connecting the discharge resistor to the bracket part to constitute the discharge circuit.

6. In a power line in which a plurality of line phase conductors are supported by line poles of insulating material with a top conductor and a plurality of lower conductors disposed below the top conductor, the top conductor comprising an overhead shield means with respect to the lower conductors, a plurality of insulators supporting the line conductors in a discharge circuit including a discharge resistor connected from the bases of the insulators to ground, that improvement which comprises a unitary pole-top assembly constituted by a metal bracket having a yoke and laterally spaced side parts below the yoke adapted to be secured to the pole, a top and two lower insulators attached to the bracket at the yoke and side parts, respectively, for supporting the line conductors, and gap means on the bracket adapted to cooperate with the top conductor to define an arcing path across the top insulator, the said arcing path having a breakdown voltage less than the breakdown voltage of the side insulators.

7. A unitary pole-top assembly in accordance with claim 6, in which the gap means is constituted by a metal gap electrode secured to the bracket adjacent the top insulator.

8. A unitary pole-top assembly in accordance with claim 7, in which the arcing path has a breakdown voltage less than the breakdown voltage of the top insulator.

9. Electric power line apparatus in accordance with claim 8 and, in combination therewith, a discharge resistor having the magnitude and exponent of the resistance characteristic thereof related to the coupling between the top conductor and lower conductors and to the ratio of breakdown voltages of the arcing path and the breakdown voltage of the lower insulators, whereby the voltage between the bases of the lower insulators and the lower conductors, when lightning-induced overvoltages on the top conductor are being discharged across the top insulator and through the discharge resistor, is less than the breakdown voltage of the lower insulators, and means connecting the resistor to the metal bracket.

10. A unitary pole-top assembly for supporting three line conductors on a line pole in insulated spaced relation from the earth, in a top position and two lower positions below the top position, the top conductor comprising an overhead shield means with respect to the lower conductors, comprising a metal bracket in the form of an inverted substantially U-shaped piece having a yoke, laterally spaced side arms below the yoke, and means for mounting the bracket on the line pole adjacent the top extremity thereof, a top insulator attached to the yoke and two lower insulators attached to the side arms below the top insulator, and conductive gap means on the bracket defining an arcing path across the top insulator, the said gap means having a discharge voltage less than the breakdown voltages of the lower insulators.

11. Apparatus in accordance with claim 10, in which the gap means is constituted by a metal gap electrode on the bracket adjacent the top insulator.

12. Apparatus in accordance with claim 11 and, in combination therewith, a discharge resistor and means mechanically and electrically connecting the resistor to the metal bracket.

References Cited

UNITED STATES PATENTS

| | | | |
|---|---|---|---|
| 1,876,577 | 9/1932 | Austin | 174—2 X |
| 2,172,640 | 9/1939 | Nelson | 317—72 X |
| 2,280,917 | 4/1942 | Jones | 317—61 X |
| 2,535,423 | 12/1950 | Jorgensen | 174—140 |

FOREIGN PATENTS 322,891  12/1959  Great Britain.

OTHER REFERENCES

A. B. Chance Co., "Eight New Ways To Clean Up Your Overhead System," Electrical World, vol. 163, No. 14, Apr. 5, 1965, pp. 96 and 97.

LARAMIE E. ASKIN, *Primary Examiner.*